(12) United States Patent
Fader et al.

(10) Patent No.: US 6,481,702 B1
(45) Date of Patent: Nov. 19, 2002

(54) REDUCTION OF COIL SPRING LOAD HEIGHT VARIABILITY

(75) Inventors: Joe Fader, Brighton; Chris Keeney, Troy, both of MI (US); Jim Hawkins, Madison, AL (US); Mark Clements, Lapeer; Steve Yollick, Troy, both of MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 12 days.

(21) Appl. No.: 09/665,426

(22) Filed: Sep. 20, 2000

(51) Int. Cl.⁷ .............................. B60G 13/00; F16F 7/00
(52) U.S. Cl. .................... 267/220; 267/166; 29/896.91; 29/896.93
(58) Field of Search ............................ 29/896.9, 896.91, 29/896.92, 896.93, 227; 140/89; 280/6.157; 267/179, 180, 166, 170, 175, 177, 220, 521

(56) References Cited

U.S. PATENT DOCUMENTS

| | | | | |
|---|---|---|---|---|
| 2,409,265 A | * | 10/1946 | Fenton ........................ 140/89 |
| 3,578,279 A | * | 5/1971 | Scheldorf ..................... 267/179 |
| 3,862,751 A | * | 1/1975 | Schwaller ..................... 267/179 |
| 4,162,064 A | * | 7/1979 | Bouton et al. ............... 267/177 |
| 4,475,725 A | * | 10/1984 | Niemann ..................... 267/179 |
| 5,090,657 A | * | 2/1992 | Dreiman ..................... 267/179 |
| 5,467,970 A | * | 11/1995 | Ratu et al. ................... 267/220 |
| 5,772,191 A | * | 6/1998 | Nakano et al. .............. 267/179 |
| 6,254,072 B1 | * | 7/2001 | Bono et al. ................. 267/220 |

* cited by examiner

Primary Examiner—Paul N. Dickson
Assistant Examiner—Robert A. Siconolfi
(74) Attorney, Agent, or Firm—Carlson, Gaskey & Olds

(57) ABSTRACT

A method of making the load height of a suspension coil spring more consistent uses different sized isolators to make a combined spring and isolator height more consistent. The isolator or isolators may be attached to the top or the bottom, or to both the top and bottom of a spring. The load height of a spring is measured. Isolators of varying heights are attached to the springs to achieve more consistency in the overall load height.

10 Claims, 5 Drawing Sheets

REDUCTION OF COIL SPRING LOAD HEIGHT VARIABILITY

BACKGROUND OF THE INVENTION

This invention includes a method of assembling coil springs under load to isolators of varying height to provide a more consistent overall assembled height. Coil springs are used in vehicle suspension systems at various locations and for various functions. Springs may be used to isolate the vehicle interior from bumps, dips, unevenness and other obstacles in the roadway. Generally, springs in a suspension provide a dampening effect and a more comfortable ride for the occupants.

Suspension coil springs typically used in large vehicles also tend to be of large diameter and height. There are always possible manufacturing tolerances or inconsistencies in springs. The larger the spring, the greater the potential inconsistency in the manufacturing process.

Coil springs are typically made out of steel wire. No matter how tightly manufacturing tolerances are controlled in the manufacturing process the overall spring height may vary. One common variation is the spring height under a given load. That is, two springs manufactured together may each have an individual reaction to a particular load that changes the height of the spring. Vehicle manufacturers would like a consistent height under a given load. However, the different height springs make this difficult. The varying spring heights can effect other components such as moving the frame too low or too high.

One current method of accommodating the variation of coil spring height under load is to measure and test each spring under a given load. After each spring is tested a tolerance height is set. Springs that do not meet the required tolerance under load are not used. The springs may be sorted into categories and grouped by load height (i.e. low, medium, high). Springs of one group are used on a vehicle such that the reaction of the springs on the vehicle is at least somewhat consistent. This process is cumbersome and time consuming.

SUMMARY OF THE INVENTION AND ADVANTAGES

This invention generally includes methods of controlling the load height variability in coil springs used in a vehicle suspension system. The methods involve placing springs under load and then assembling an isolator to the spring. The isolators are of varying heights to compensate for different spring heights. The isolator and spring are then assembled into the suspension. Isolators can be assembled to the top, bottom or both the top and bottom of the spring.

Different methods of forming the spring to the isolator can be used. The springs can be placed into molds with a preset dimension in the mold cavity to represent the isolator. The mold cavity may also be an adjustable so that a single mold can be used to mold the isolator to the spring. In a mold with an adjustable mold cavity the spring is placed under a load and the height of the mold cavity is adjusted. Adjusting the mold cavity to the desired position ensures an overall constant height when the spring and isolator are assembled together under load. Alternatively, the isolators can be formed separately from the springs and then added to the spring.

Adding isolators to the spring ensures a more consistent overall load height for each spring and isolator assembly.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
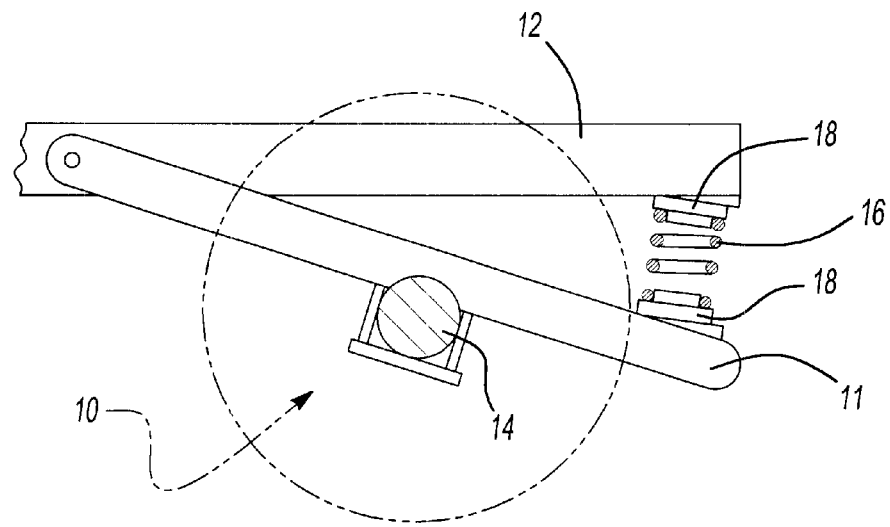
FIG. 1 is a schematic view of a suspension system incorporating a coil spring with isolators.

Referring to the Figures, wherein like numerals indicate like or corresponding parts throughout the several views. A vehicle suspension system is shown generally at 10 in FIG. 1. An arm 11 is mounted to a vehicle frame 12 and supports an axle 14. The arm is attached to a coil spring 16, and isolators 18 are mounted at the ends of the spring 16. Coil spring 16 dampens movement of the arm 11. It should be understood that system 10 is shown schematically. Any application of springs 16 in a vehicle suspension 10 would come within this invention.

Figure 2:
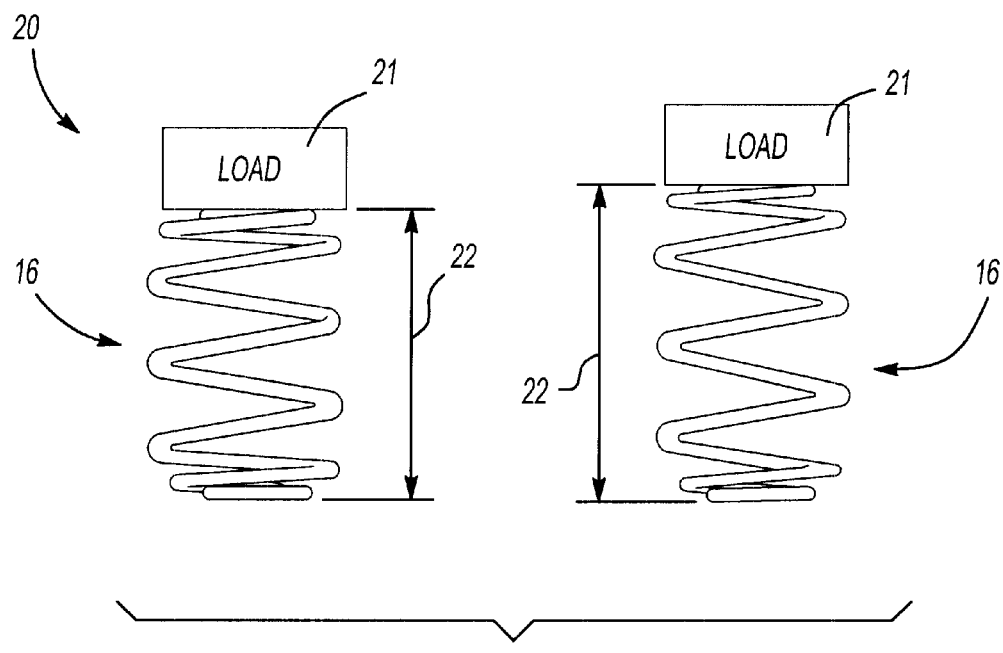
FIG. 2 is a schematic view depicting the different load heights of two spring supporting the same load.

FIG. 2 illustrates a problem in the manufacture of coil springs 16 as shown generally at 20. Two coil springs 16 are shown under a load 21, which is the same on both springs 16. The springs 16 maybe manufactured to the same specifications and the springs 16 may be from the same lot. The height dimension of the springs 16 under a load 21, which will be hereafter called the load height dimension 22, can be seen to be different. The load height dimension 22 difference of supposedly identical springs 16, under the same load 21, is due to the fact that there may be variations in any spring 16.

Figure 3:
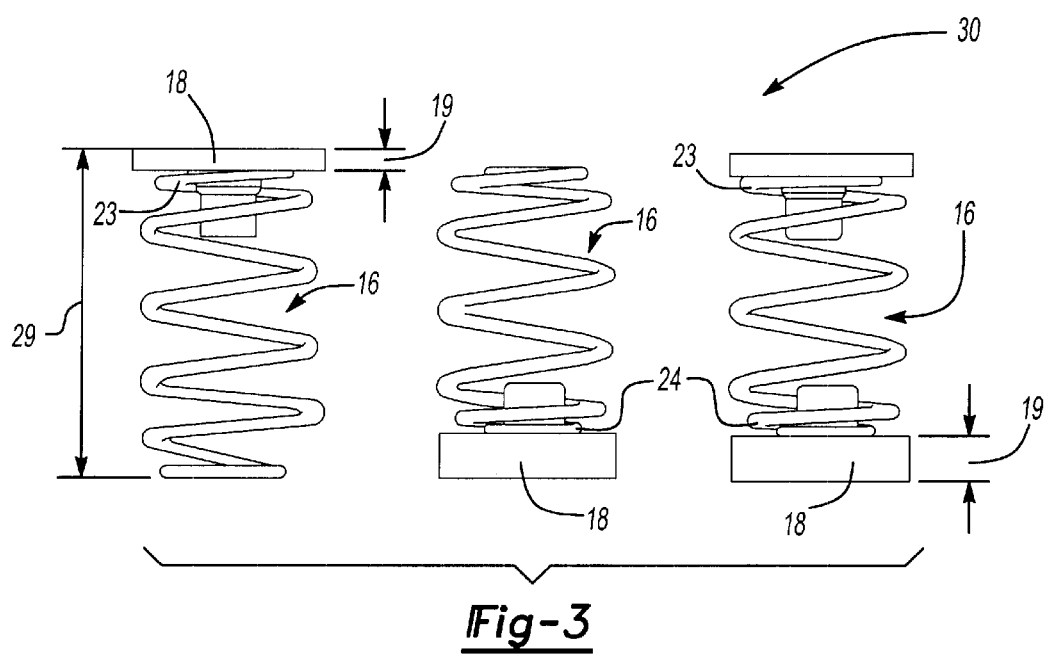
FIG. 3 is a schematic view of springs assembled to isolators.

FIG. 3 shows an aspect of applicants invention. Isolators 18 are provided of varying base height dimensions 19. The isolators 18 can be used on the top 23, the bottom 24, or both top 23 and bottom 24 of the coil spring 16, to achieve a more consistent overall load height dimension 22. A total height dimension 29 is the height of the spring 16 and isolators 18 assembled together, under a load 21. The use of the various isolators 18 allows the total assembled height dimension 29 to be kept relatively equal.

Figure 4:
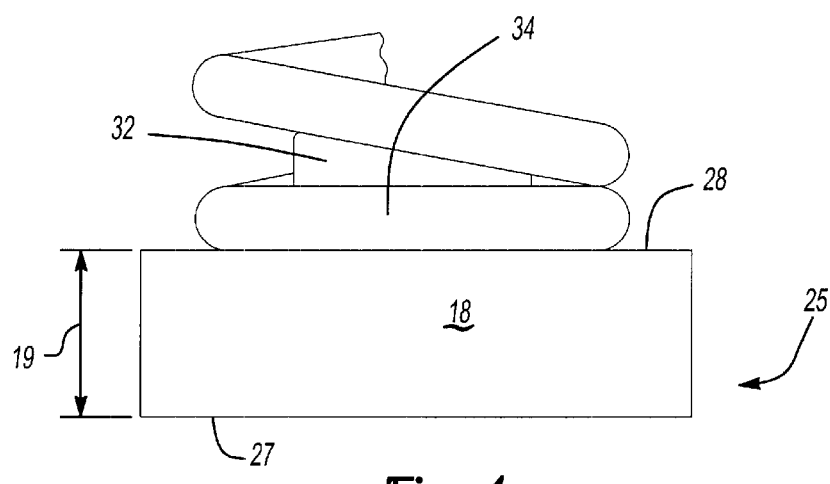
FIG. 4 is a schematic view of an isolator.

An isolator 18 is shown in FIG. 4 and has a base 25 with a bottom 27 surface and a top 28 surface. A base height dimension 19 is defined between the surfaces 27, 28. A circular protrusion 32 extends out of the top 28 surface of the base 25 to fit in the center 34 of the coil spring 16.

Referring again to FIG. 3, after the manufacture of each spring, a load 21 is placed on top 22 of the coil spring 16 and the height dimension of the coil spring 16 under load 21 is measured. The load 21 is consistent during each test. A tolerance range is set for the measured load height. If the load height is outside the tolerance range, the spring 16 may be discarded. The springs 16 may then be separated into one group of springs measuring on the high end and a group of springs measuring on the low end. Of course, more than two separate groups can be defined.

Figure 5:
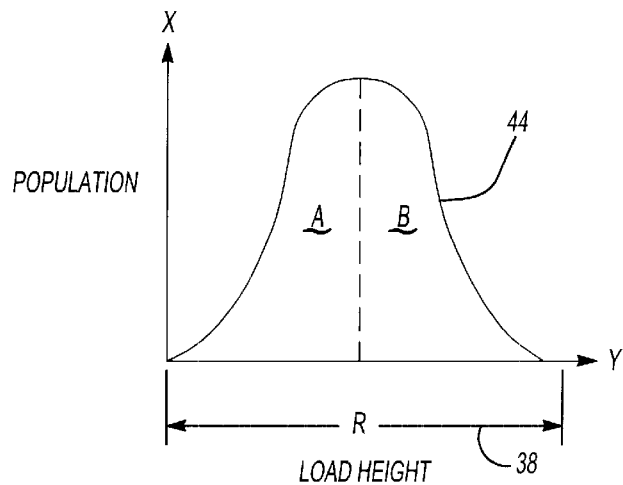
FIG. 5 is a graph of the distribution of the coil spring load height measurements.

Shown generally at 50 in FIG. 5, a range 38 of load height data is shown plotted on an X, Y axis. A distribution 44 of the coil spring load height data shown will typically be bell shaped. One method of this invention uses this population information. A mean of the load height distribution 44 is calculated. After the mean is calculated the springs are sorted into two groups. One group includes springs that measure below the mean. For purposes of FIG. 5 this group is illustrated as group A. Another group includes springs measuring above the mean, illustrated as group B. In this method load height dimension 22 data is divided into two groups. However, the data may be divided into any number of groups under the following method.

Figure 6:
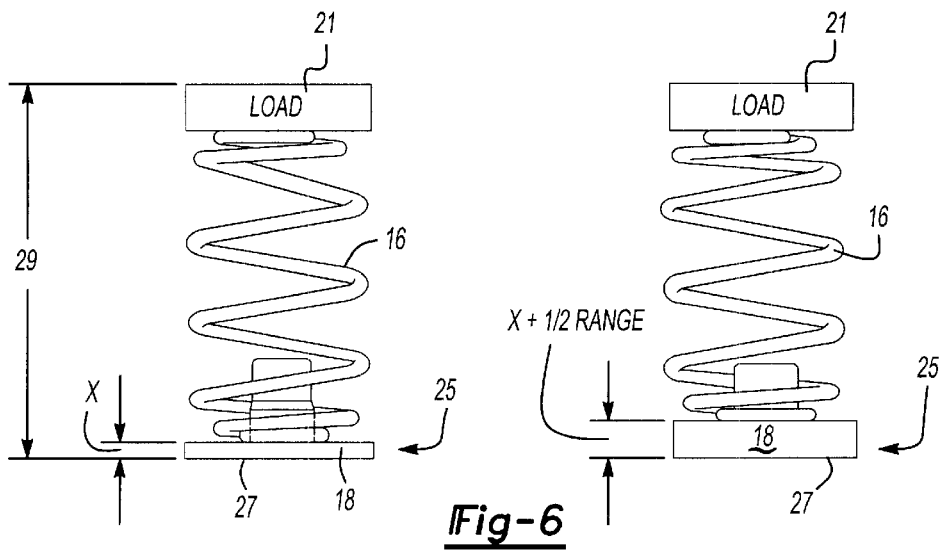
FIG. 6 is a schematic view of coil springs under load with the one isolator having varying base height dimension and showing the overall assembled load height to be consistent.

As shown in FIG. 6, the coil springs 16 from group B are assembled to isolators 18 with a predetermined base height of X. The coil spring 16 from group A are assembled to isolators 18 with base height of X plus 0.5 multiplied by range 38, (see FIG. 5). The range 38 value is determined as an acceptable spread for the measured coil spring 16 load height values. That is, the range 38 need not extend to include all data, but may limit the extreme samples. The extra height of the isolators 18 used with Group A springs makes the combined height of the springs 16 and isolators 18 more consistent.

The above embodiments are explained with separately formed isolators 18 which are assembled to the coil spring 16. The same invention can be achieved by molding the isolators 18 to the springs 16.

Figure 7A:
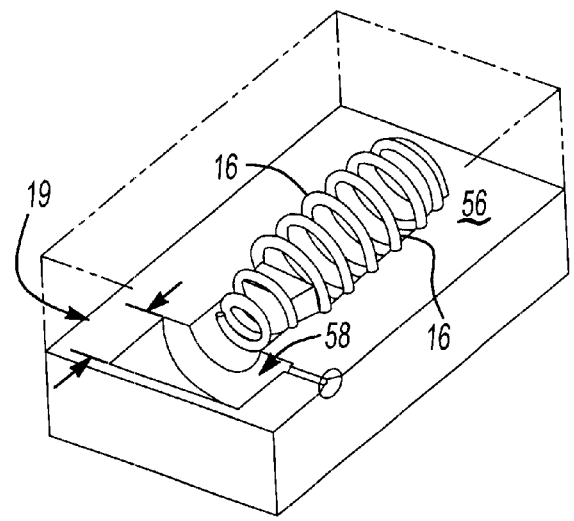
FIG. 7A is a schematic view of coil springs from group A placed inside a mold with the mold cavity having a large base height.
Figure 7B:
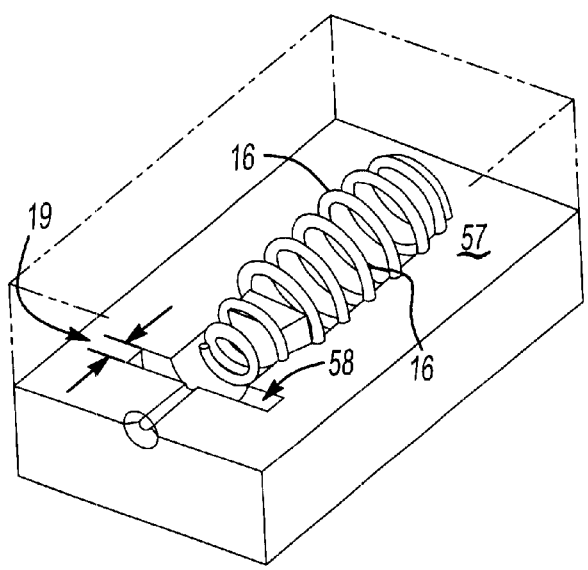
FIG. 7B is a schematic view of coil springs from group B placed inside a mold with the mold cavity having a small base height.

Another embodiment of the invention shown generally at 70 in FIGS. 7A and 7B, involves placing the coil spring 16 into a mold 56, 57 after the springs 16 load height is measured. The mold cavity 58 would take the same shape of an isolator (not shown). As shown in FIG. 7A a spring 16 with a smaller load height is placed into a mold 56 with a larger base height portion 19 in the mold cavity 58. As shown in FIG. 7B a spring 16 with the larger load height is placed into a mold 57 within the mold cavity 58 having a shorter base height 19. Elastomeric and/or polymer material is injected into the molds 56, 57 and the coil spring 16 and isolator 18 become a one piece assembly. Also, more than two different molds 56, 57 and mold cavities 58 may be used to further reduce the tolerance on the overall assembled load height dimension 29 (i.e. the springs and molds could be further divided in small, medium and large heights, etc.).

Figure 8:
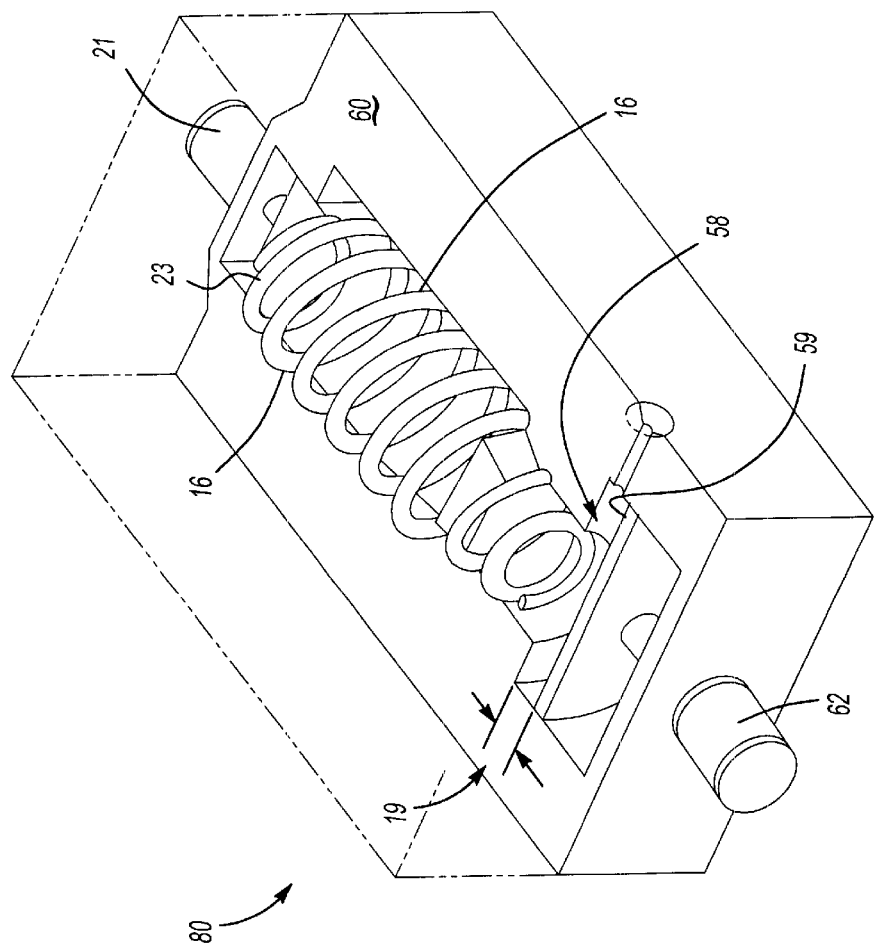
FIG. 8 is a schematic view of a mold having a moveable base portion in the mold cavity while the spring is under load.

Another method of forming an isolator (not shown) is shown schematically at 80 in FIG. 8. In this method, a single mold 60, and single adjustable mold cavity 58 is used. A spring 16 is placed in the mold 60 and subjected to a load 21. The variable mold cavity 58 contains a plate 59 which is adjusted by pushing a plunger 62. The plunger 62 and plate 59 together adjust the mold cavity 60 base height dimension 19. Constant height can therefore be achieved when the spring 16 is under a load 21. It should be understood that the FIG. 8 embodiment only shows this method schematically. In fact the load 21 would preferably be applied to the end of the spring associated with plate 59. A worker in the molding art would be able to develop an appropriate mold.

The FIG. 8 embodiment allows the combined height of each spring and isolator to be made equal. The earlier embodiments simply move the combined height to be more equal, within the incremental tolerances of the different isolator sizes. The invention has been described in an illustrative manner, and it is to be understood that the terminology which has been used is intended to be in the nature of words of description rather than of limitation. Although the inventive variation is achieved by varying the isolators, it should be understood that other spacers could provide the same variation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method of controlling the load height variability in coil springs used in a vehicle suspension system comprising:

a.) forming a spring having a particular height in response to a particular load relative to a desired height for the particular load, b.) forming isolators having various heights, and associating a particular isolator of a given height with a particular spring based upon said spring height, c.) assembling said particular spring and said particular isolator to achieve the desired height, and d.) installing said particular spring and said particular isolator into a suspension.

2. A method as set forth in claim 1, wherein step (b) is achieved by placing said spring in a mold and forming said isolator in said mold on said spring.

3. A method as in claim 2, wherein an isolator height dimension in said mold is changed to a particular dimension to ensure constant combined height of said spring and isolator.

4. A method as in claim 2, wherein at least two types of said molds are used, based upon the measured height of said springs.

5. A method as in claim 2, wherein said springs are divided into at least two groups, with springs having a smaller load height placed into a first mold cavity having a larger base height dimension, and springs having a larger load height placed into a second mold cavity having a smaller base height dimension.

6. A method as recited in claim 5, wherein a mean value of spring heights for a load is determined, and a difference between a base height in said first and second molds is based on said mean value.

7. A method as in claim 1, wherein said isolators are formed remote from said springs and then added to said springs.

8. A method as in claim 1, further comprising the step of directly applying the particular load to the spring to determine the particular height.

9. A method as in claim 8, further comprising the step of applying the particular load to the spring while the spring is within a mold.

10. A method as in claim 9, further comprising the step of adjusting the size of a cavity within the mold.

\* \* \* \* \*